United States Patent
Lam et al.

(10) Patent No.: US 6,823,103 B2
(45) Date of Patent: Nov. 23, 2004

(54) OPTICAL DEVICES FOR CONTROLLING INSERTION LOSS

(75) Inventors: Jane Lam, San Jose, CA (US); Liang Zhao, San Jose, CA (US); Kenneth McGreer, Fremont, CA (US); Hao Xu, Sunnyvale, CA (US); Wayne Wai Wing Lui, Fremont, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 274 days.

(21) Appl. No.: 09/955,630

(22) Filed: Sep. 18, 2001

(65) Prior Publication Data

US 2002/0076145 A1 Jun. 20, 2002

Related U.S. Application Data

(60) Provisional application No. 60/256,011, filed on Dec. 15, 2000.

(51) Int. Cl.[7] ................................................. G02B 6/28
(52) U.S. Cl. ............................. 385/24; 385/15; 385/31
(58) Field of Search ........................... 385/24, 8, 9, 39, 385/37, 10, 2, 31, 129, 14; 522/149; 359/251, 283

(56) References Cited

U.S. PATENT DOCUMENTS

| | | | |
|---|---|---|---|
| 5,745,619 A | 4/1998 | Li et al. | 385/48 |
| 5,828,800 A | 10/1998 | Henry et al. | 385/16 |
| 5,854,868 A | 12/1998 | Yoshimura et al. | 257/E51.012 |
| 5,859,717 A | 1/1999 | Scobey et al. | 385/24 |
| 5,894,535 A | 4/1999 | Lemoff et al. | 385/14 |
| 5,982,960 A | 11/1999 | Akiba et al. | 385/24 |
| 6,195,481 B1 | 2/2001 | Nakajima et al. | 385/24 |
| 6,229,938 B1 * | 5/2001 | Hibino et al. | 385/24 |
| 6,404,946 B1 * | 6/2002 | Nakajima et al. | 385/24 |
| 6,477,294 B1 * | 11/2002 | Jansen Van Doorn et al. | 385/24 |
| 6,549,696 B1 * | 4/2003 | Uetsuka et al. | 385/24 |
| 6,591,034 B1 * | 7/2003 | Albrecht et al. | 385/24 |

FOREIGN PATENT DOCUMENTS

| | | | |
|---|---|---|---|
| EP | 1 045 263 | 10/2000 | G02B/6/12 |
| GB | 2 327 773 | 2/1999 | G02B/6/10 |
| JP | 2001013337 A * | 1/2001 | G02B/6/12 |

OTHER PUBLICATIONS

Okamoto K. (2000) "Fundamentals of Optical Waveguides", Academic Press, pp. vii–xi ( Table of Contents).

Murukami, M. et al. (1997). "Transoceanic Twelve 10 Gbit/s WDM Signal Transmission Experiment with Individual Channel Dispersion–and–Gain Compensation and Pre–chirped RZ Pulse Format," *Electronic Letters* 33(25):2145–2146.

Yamada, T. et al. (1997). "Loss Equalisation Technique Using Carbon Cluster–Doped Polyimide Film and Its Application to 32–Channel Optical Wavelength Selector Module," *Electronic Letters* 36(12):1053–1055.

* cited by examiner

*Primary Examiner*—Frank G. Font
*Assistant Examiner*—Kevin C Kianni
(74) *Attorney, Agent, or Firm*—Morrison & Foerster LLP

(57) ABSTRACT

The invention relates to an optical device which carries multiple optical signals where the optical device has a plurality of distal waveguides some of which may be configured to control insertion loss among the multiple optical signals.

19 Claims, 9 Drawing Sheets

OPTICAL DEVICES FOR CONTROLLING INSERTION LOSS

CROSS-REFERENCE TO RELATED APPLICATIONS

This application claims the benefit of U.S. Provisional Patent Application Ser. No. 60/256,011, filed on Dec. 15, 2000, which is incorporated herein by reference in its entirety.

FIELD OF THE INVENTION

The invention relates to an optical device which carries multiple optical signals where the optical device has a plurality of distal waveguides some of which may be configured to control insertion loss among the multiple optical signals.

BACKGROUND OF THE INVENTION

There is an increasing demand for telecommunication capacity as a result of increased Internet traffic, a growing number of telephone lines for telephones, fax, and computer modems, and an increase in other telecommunication services. This increasing demand is being addressed through the combination of multiple telecommunication signals for concurrent transmission through telecommunication lines to increase telecommunication capacity. One way of increasing capacity is by combining multiple signals through the use of wavelength division multiplexing (WDM) or dense wavelength division multiplexing (DWDM). WDM involves combining or multiplexing a plurality of optical signals having a predetermined difference in their wavelengths. The multiplexed signals are transmitted over a single optical fiber. An optical wavelength multiplexer/demultiplexer is essential to the transmission of a multiplexed signal as a multiplexer/demultiplexer can combine optical signals of different wavelengths or separate a multiplexed signal into several optical signals based upon the respective wavelength of each signal. An arrayed-waveguide grating is one standard device used as an optical wavelength multiplexer/demultiplexer.

A multiplexer combines multiple optical signals having different wavelengths into a multiplexed signal. This multiplexed signal is then transmitted through the optical system, which can include amplifiers, optical fiber, receivers, and other optical components typically used in WDM systems. When the multiplexed signal reaches its destination, a demultiplexer uses the different wavelengths of the signals within the multiplexed signal to separate signals thereby allowing routing of the individual signals to their particular destination.

Multiple routing functions including multiplexing or demultiplexing are customarily integrated on a silicon wafer to form a planar lightwave circuit (PLC). PLC's are integrated optic devices made using tools and techniques developed by the semiconductor industry. Although integrating multiple components on a PLC lowers the manufacturing, packaging, and assembly costs per function, challenges remain to increase performance of the PLC.

An arrayed-waveguide grating (AWG) integrated optical device for wavelength demultiplexing includes at least one input waveguide for receiving a wavelength division multiplexed signal from the optical system. As discussed above, the wavelength division multiplexed signal comprises a plurality of signals each of which has a unique wavelength. The AWG contains an input slab waveguide for expanding the wavelength division multiplexed signals coupled from the input waveguide into the input slab waveguide. The device also has a phased array of waveguides comprising a plurality of waveguides, each of which has a predetermined length. The "phased arrays" may also be called a "grating region." The lengths of each waveguide in the phased array differs from each other by a predetermined amount and correspond to the difference between the wavelength of the signals. The difference in lengths of these waveguides causes the light travelling through a waveguide to leave the waveguide with a phase difference from light travelling through another waveguide of a different length. Next, the AWG has an output slab waveguide which focuses the signals of different wavelengths leaving the waveguides of the phased array into a plurality of predetermined positions in accordance with the respective wavelength differences. The AWG also contains a plurality of output waveguides. The output waveguides each have a first and second end where the first end is connected to an external device and the second end of each output waveguide is arranged at a distinct position where each signal separated by its respective wavelength is coupled one of the output waveguides and may be transmitted to the external device.

In operation of the device, the input waveguide of the chip routes the multiplexed signal to the input lens. Then, the signal expands into the free propagation region of the input slab. Next, the expanded wavefront is coupled to the individual waveguides of the phased array. The waveguides of the phased array are arranged radially along an arc of the input slab waveguide. As discussed above, each waveguide of the phased array has a length which is different from another waveguide in the phased array. As the wavefront exit the waveguides of the phased array, each signal has a predetermined phase delay resulting from the length differences of the waveguides and the differences in wavelengths of the signals. The phase delay causes the signals to be refracted to different region in the output slab waveguide. Since the phase delay depends on the wavelength of the signal, each signal with a different wavelength has a different phase delay which causes the signal to be focused into different positions along an arc of the output slab waveguide. The output waveguides are arranged in order along the arc of the output slab waveguide. Accordingly, each signal, having its respective phase delay, is transmitted into a particular output waveguide. A description of the operation of these devices may be found in Katsunari Okamoto, *Fundamentals of Optical Waveguides* (Academic Press, 2000) the entirety of which is hereby incorporated by reference.

The structures of a multiplexer and a demultiplexer are often similar with the device mode of operation depending upon the application. For example, a multiplexer may simply be the reverse operation of the above described demultiplexer. In other words, using the example described above, a multiplexer receives a plurality of signals at an end of the device (in the above example, the output end) and the signals are combined into a multiplexed signal which leaves the opposite end (in the above example, the input end.) Other applications require specialized device functional parameters, which can only be realized through design of the individual parts of the device.

The transmission properties of entire optical system dictate the design parameters for the multiplexer/demultiplexer component. The basic device structure of the AWG provides certain characteristic spectral signatures. For instance, as a signal emerges from each output waveguide of the AWG, the signal experiences a decrease in the amount of optical power relative to the amount of optical power entering the AWG for each individual channel. This loss is referred to as "insertion loss" (IL) and is an important example of such a spectral signature. IL may result from device fabrication methods, and/or coupling of the grating waveguides to/from the input and output lenses. Other sources causing IL may also exist.

IL is not identical for all the output channels of an AWG. As described in Okamoto, the free spectral range of the grating order determines the IL uniformity. This intrinsic uniformity can differ from the desired system profile. In an AWG, signals leaving the output waveguides located more distantly from a symmetrical axis of the output slab waveguide experience higher IL than signals leaving the output waveguides located closer to the symmetrical axis. It may be desirable for an optical wavelength multiplexer/ demultiplexer to minimize the difference in IL between signal with the highest IL and the signal with the lowest IL to achieve a uniform overall transmission loss for each of the signals of different wavelengths. In another example, it may be desirable to deliberately configure each output channels to have an IL that is designed for a selected response other than minimizing the EL between signals as described above.

A known technique for reducing the loss of each separated signal is discussed in U.S. Pat. No. 5,982,960 to Akiba et al. which teaches that each output channel waveguide at the PLC edge is provided with an outwardly tapered end. Each tapered end has a width at its end surface which is larger as the output channel waveguide becomes distant from the symmetrical axis of the output slab waveguide. In the device taught by Akiba et al., the coupling loss becomes lower as the width of the tapered end become larger. Therefore, Akiba et al. teaches adjusting the loss associated with each signal at the interface of a PLC and the optical fibers external to the PLC.

However, adjusting IL at the interface of a PLC and optical fibers may introduce additional problems. Lateral misalignment, defined as the offset between the central axis of the fiber and the central axis of the waveguide on the device, may introduce IL. In the use of a fiber array, lateral misalignment may occur in a direction described by a displacement vector that is perpendicular to the edge of the device but lies in the plane of the axes of the fibers. A problem may arise if waveguides of a device each have tapers of different sizes for each output. Depending upon the degree of lateral misalignment, the change in insertion loss as a result of the lateral misalignment may be different for each channel given the different widths of the channel at the interface. Accordingly, if the sizes of the waveguides at the PLC/fiber interface are the same, then the insertion loss for each channel will be the same given a particular lateral misalignment.

Moreover, it is known, for example, that large fiber arrays often experience bowing, which may also lead to a non-uniform IL at the output channel/fiber interface. In such a case, given the deviation between PLCs which may arise from such factors as bowing, it may be difficult to generate high production volumes of PLCs that consistently control insertion loss at the PLC/optical fiber interface.

While current attempts to achieve uniformity of IL show some promise, additional measures are required. A need remains to be able to achieve a high degree of control of IL without altering other aspects of the performance of the device. Accordingly, it may be desirable to control insertion loss within the PLC itself.

SUMMARY OF THE INVENTION

The invention provides an optical device for controlling insertion loss of wavelength-division multiplexed signals comprising a plurality of signals, each signal having a predetermined wavelength different from the remaining signals, the optical device comprising an phased array having a proximal end and a distal end, the phased array comprising a plurality of waveguides extending between the input and output ends, each the waveguide having a predetermined length different from another waveguide; at least one proximal waveguide having a first end and a second end; a proximal slab waveguide between the proximal end of the phased array and the second end of the proximal waveguide; a plurality of distal waveguides each having a first end and a second end, at least one of the plurality of distal waveguides includes at least one gap between the first and second ends; and a distal slab waveguide between the distal end of the phased array and the second end of the distal waveguide.

One variation of the invention includes varying the gap of each of said distal waveguides. The gaps may be varied with the largest towards a center axis of the distal slab waveguide. In another variation of the invention the gap of each distal waveguide is selected to introduce an insertion loss for each distal waveguide such that a difference in insertion loss between each of the plurality of distal waveguides is minimized.

In another variation of the invention, the gaps form an angle with the distal waveguide in a plane of the distal waveguide. The angle may be between 70 and 90 degrees when measured between a face of said distal waveguide adjacent to said gap and a side of said distal waveguide. In another variation, the gaps may form an angle with an axis orthogonal to a plane of the distal waveguide. This angle may also be between 70 and 90 degrees when measured between a face of the distal waveguide adjacent to the gap and the axis. In either of the above cases, the angle may be 82 degrees.

A variation of the invention includes the optical device wherein at least one of the distal waveguides has more than one gap.

In another variation of the invention the gaps may only extend partially through a waveguide. The distal waveguides which have a gap may includes a first portion and a second portion on either side of the gap where the first and second portions are misaligned by an offset distance.

The gap of the present invention may include a gap material that is placed within said gap. In one variation of the invention, the gap may have a width that is greater than a width of the gap material. The invention includes a variation where the gap material comprises an offset section of distal waveguide.

The invention may also include a variation where the optical device is a planar lightwave circuit.

The invention also provides a method controlling insertion loss between a plurality of input or output signals of a planar lightwave circuit comprising the act of transmitting at least one of the signals across at least one distal waveguide having a gap. The method may further include the act of transmitting the plurality of signals across a plurality of distal waveguides each having a respective gap which varies in width. The width of each respective gap may decrease as the waveguide is farther away from a center waveguide of the plurality of waveguides. Another variation of the method includes transmitting at least one of the signals across at least one distal waveguide having a gap where the gap forms an angle with the distal waveguide.

DETAILED DESCRIPTION OF THE INVENTION

Figure 1A:
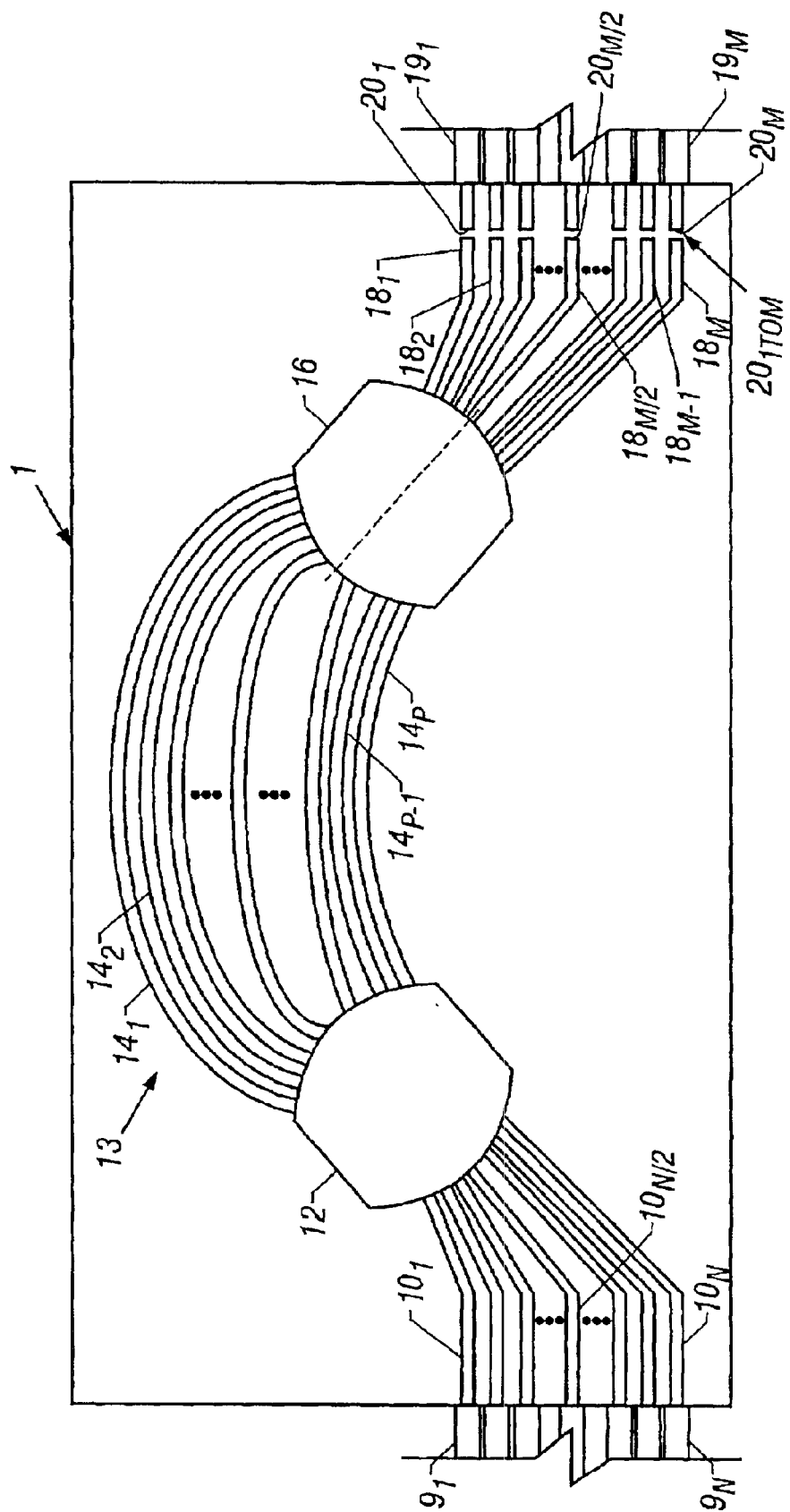
FIG. 1A is a plane view showing a representation of an optical device being used to mutiplex or demultiplex optical signals.

FIG. 1A illustrates a schematic representation optical device of the present invention wherein the device is a planar lightwave circuit (PLC) 1. Although the PLC illustrated is an N×M PLC, it is intended that the invention may be used in a 1×M PLC as well. Furthermore, although the invention is discussed for use in PLC's, it is contemplated that the invention is not limited as such. The invention may be used in any electro-optical device having a plurality of waveguides which requires controlled adjustment of the insertion loss between the signals transmitted through the device. For example, the invention may be incorporated into optical power splitters, OADM (optical add/drop multiplexer), DGEF (dynamic gain equalization filter), etc. The device 1 of the present invention may be formed using wet-etch, flame hydrolysis deposition (FHD), chemical vapor deposition (CVD), reactive ion etching (RIE) or other standard techniques used in the semiconductor industry to deposit and pattern optical waveguide materials. As illustrated in FIG. 1D, the end result is that a waveguide 3 comprised of a core material (or a plurality of layers of core material) is located on a bottom cladding layer 7, both of which are covered by a top cladding layer 5. Usually, the waveguide 3 has a rectangular cross section. The waveguide 3, top and bottom cladding layers 7, 5 are usually placed on a substrate 8. A typical waveguide (proximal or distal) may be, for example, 6 μm×6 μm. However, such dimensions are only exemplary as other configurations are within the scope of this invention. The top cladding layer 5 often has the same index as the bottom cladding layer 7. However, the index of the waveguide 3 is larger than either of the cladding layers 5, 7. The cladding layers 5, 7 and waveguide 3 are placed on a substrate 8, usually silicon, glass, or InP.

Figure 1B:
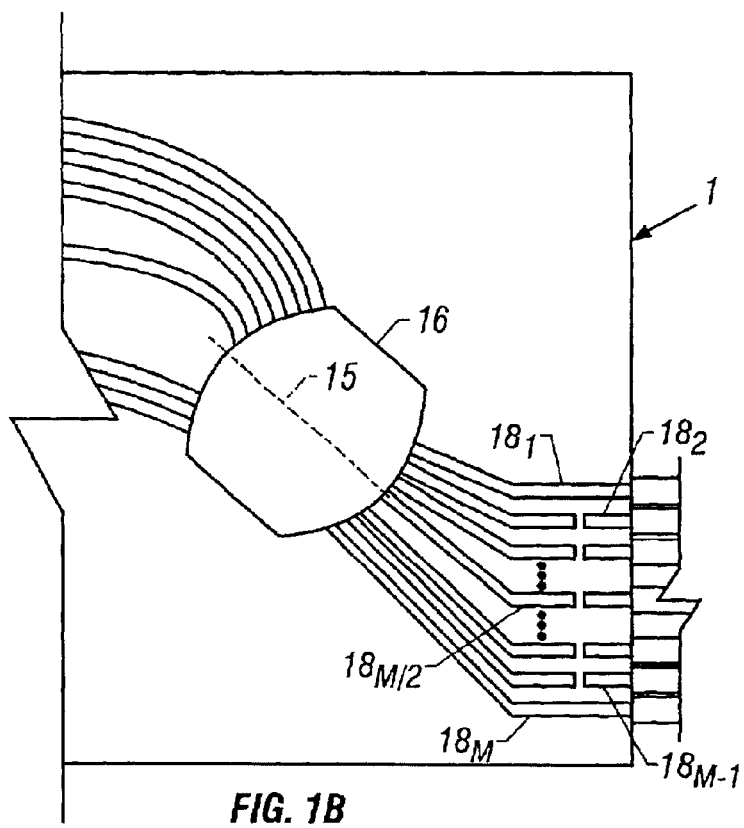
FIGS. 1B–1C are sectional views of devices of the present invention.
Figure 1C:
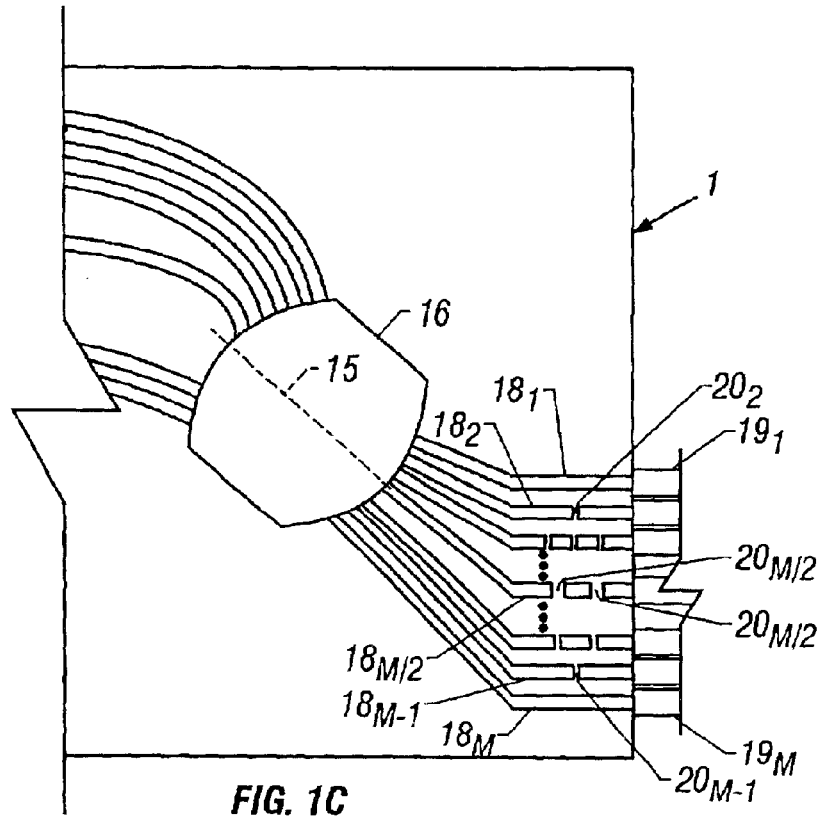
Figure 1D:
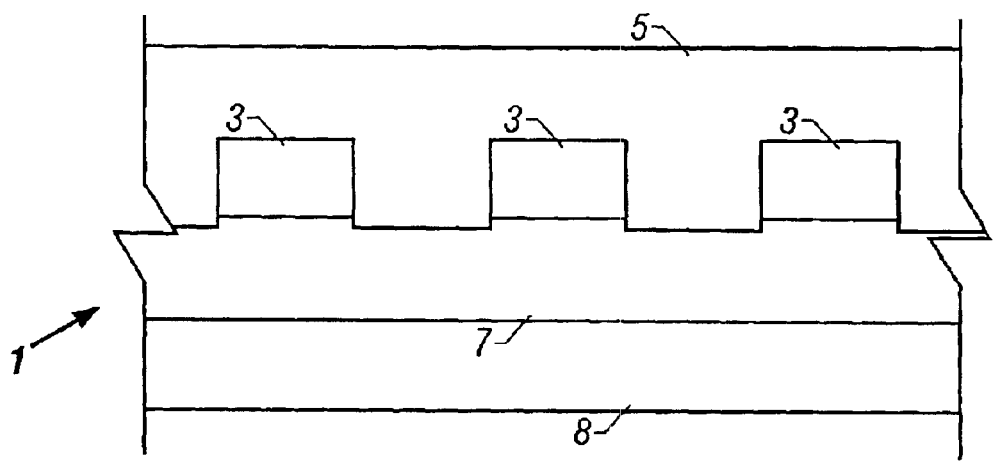
FIG. 1D illustrates a partial side view of a waveguide in an optical device.
Figure 1E:
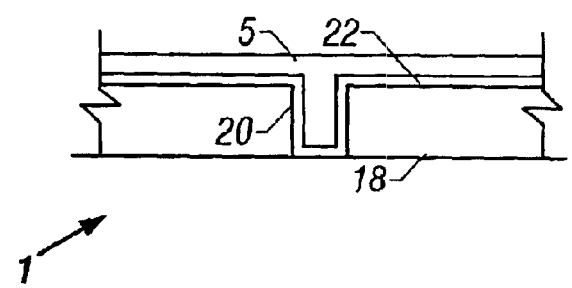
FIG. 1E illustrates a variation of a waveguide of the present invention with a gap.

FIG. 1E illustrates a variation of the invention showing the top cladding layer 5 which extends into a gap 20 of the waveguide 18 where the top cladding layer 5 and the waveguide 18 are separated by a filling material 22. The filling material 22 may be, for example, a cap oxide or any optical material.

Returning to FIG. 1A, the device 1 includes at least one proximal waveguide $10_{1\ to\ N}$, a proximal slab waveguide 12, and a distal slab waveguide 16, a phased array 13 (or grating region) having a number of waveguides $14_{1\ to\ P}$. Each waveguide $14_{1\ to\ P}$ in the phased array 13 has a proximal end connected to the proximal slab waveguide 12 and a distal end connected to the distal slab waveguide 16. The device 1 also includes a plurality of distal waveguides $18_{1\ to\ M}$ extending from the distal slab waveguide 16 to one or more edges of the device 1.

It is noted that the input/output of the device 1 depends upon the use of the device 1 as either a multiplexer or a demultiplexer. For example, if the device is used to multiplex various signals of differing wavelengths into a multiplexed signal then a number of optical fibers $19_{1\ to\ M}$ are coupled to the optical device 1 at the distal waveguides $18_{1\ to\ M}$. In such a case, the distal waveguides $18_{1\ to\ M}$ will serve as the input waveguides for the device 1. The individual signals will be multiplexed into a single signal which exits the device 1 from the proximal waveguides $10_{1\ to\ N}$. Accordingly, in this case, the proximal waveguide $10_{1\ to\ N}$ will serve as the output waveguide. If the device 1 functions as a demultiplexer, then a fiber $9_{1\ to\ N}$ is coupled to the device 1 at the proximal waveguide $10_{1\ to\ N}$, the signal is then demultiplexed into M number of signals which leave the device from the distal waveguides $18_{1\ to\ M}$. In this case the proximal waveguide $10_{1\ to\ N}$ serves as the input waveguide and the distal waveguide $18_{1\ to\ M}$ serves as the output waveguide. For sake of brevity, the following variation of the present invention shall be discussed in terms of a demultiplexer. However, it is understood that the device is not limited as such. As described above, the invention may be incorporated into a variety of optical devices.

When the device 1 is operated as a demultiplexer, a fiber 9 carrying a multiplexed signal is coupled to the proximal waveguide $10_{1\ to\ N}$. The signal travels to the proximal slab waveguide 12. The multiplexed signal is expanded into the proximal slab waveguide 12 by a diffraction effect. Therefore, the proximal slab waveguide 12 distributes the multiplexed signal into the waveguides $14_{1\ to\ P}$ of the phased array 14. As mentioned above, the waveguides $14_{1\ to\ P}$ of the phased array 14 differ in length from each other by a precise predetermined amount. Therefore, given the difference in length, the signal in each waveguide $14_{1\ to\ P}$ emerges with a different phase delay or phase difference at the distal end of the waveguide $14_{1\ to\ P}$. As the optic signals enter the distal slab waveguide 16, the signals are focused onto the distal waveguides $18_{1\ to\ M}$ Because the phase delay depends upon the wavelength of the signal, each signal having a different wavelength has a different phase delay. As a result, the distal slab waveguide 16 focuses each signal onto a different position of the distal slab waveguide 16 coupled to a distal waveguide $18_{1\ to\ M}$. Accordingly, the signals are separated and coupled into respective distal waveguides $18_{1\ to\ M}$.

The device 1 may also include tapers at either end of the phased array 14 or at the end of the distal waveguides $18_{1\ to\ M}$ which are connected to the multiple fibers $19_{1\ to\ M}$. Such tapers may improve or adjust the IL of the device. It is noted that the number of waveguides $14_{1\ to\ P}$ in the phased array 14 may be independent of the number of distal waveguides $14_{1\ to\ P}$. For example, a device 1 may have more than 100 waveguides $14_{1\ to\ P}$ (P>=100) in an phased array 14 and have anywhere from 2 to 80 or more distal waveguides $18_{1\ to\ M}$ (M=2 to M>=80). Typically, the number of distal waveguides $18_{1\ to\ M}$ which have a signal passing therethrough corresponds to the number of channels of the device 1. Moreover, a device may have more proximal or distal waveguides than shown with less than all of the waveguides being used.

As shown in FIG. 1A, the invention includes a device 1 where at least one of the distal waveguides $18_{1\ to\ M}$ each have at least one gap $20_{1\ to\ M}$. A gap is a break or discontinuity in a waveguide. The gap may extend through all or only a portion of the waveguide. The gap may comprise a free space between the separated waveguides or the gap may be filled in with a material. It is also contemplated that the gap may comprise a break in the waveguide without any measurable distance between the segments of the waveguide (e.g., the portions of the waveguide on either side of the gap are contiguous.) As described herein, the variations of the gap described herein are intended to introduce insertion loss for the signal passing through the waveguide. However, the gap is not limited to such an effect and may produce other results as well.

Figure 1F:
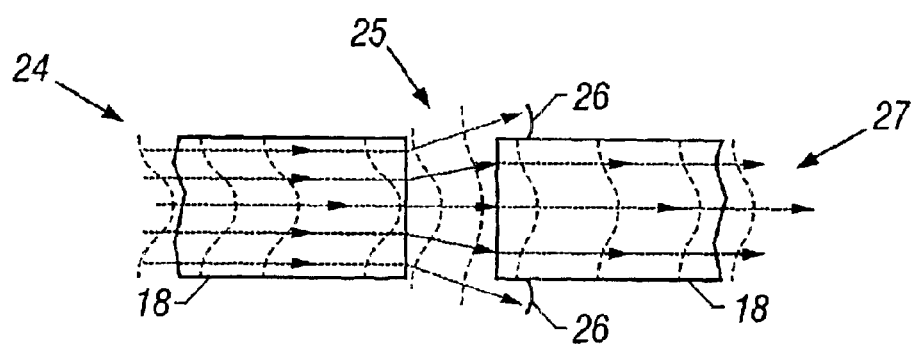
FIG. 1F demonstrates an optical signal passing through a waveguide with a gap.

FIG. 1F illustrates, in principle, operation of a waveguide 18 with a gap that provides a calibrated loss for an optical signal travelling through the waveguide 18. As light travels through the gap, the unadjusted light signal 24 passes through the gap 25 and is diffracted about the end of the waveguide 18. A portion of the signal 26 is diffracted such that it does not re-enter the waveguide 18. As a result, the resulting signal 27 experiences a loss which may be calibrated depending upon the configuration of the gap 25. The light that is radiated out of the waveguide contributes to the insertion loss for that signal or channel. Generally, it was found that larger gaps produce larger IL.

Accordingly, for the reasons described above, to achieve uniformity of IL across all channels, the gaps $20_{1\ to\ M}$ for the distal waveguides $18_{1\ to\ M}$ farthest from the center waveguide $18_{M/2}$ (if M is even) or $18_{(M+1)/2}$ (if M is odd) will be smaller than the gaps $20_{1\ to\ M}$ for the distal waveguides $18_{1\ to\ M}$ closer to the center waveguide $18_{M/2}$ or $18_{(M+1)/2}$. As previously discussed, the waveguides farthest from a symmetrical axis 15 of the distal slab waveguide 16 encounter greater IL than those closer to the symmetrical axis 15. However, the gaps $20_{1\ to\ M}$ for the distal waveguides $18_{1\ to\ M}$ maybe selected according to any configuration to achieve any desired result. It is also contemplated that the waveguides $18_{1\ to\ M}$ farthest from the center waveguide $18_{M/2}$ or $18_{(M+1)/2}$ may not have any gap $20_{1\ to\ M}$.

FIG. 1B illustrates a sectional view of another example of a device 1 of the present invention wherein the distal waveguides $18_{1\ to\ M}$ proximate to a symmetrical axis 15 of the distal slab waveguide 16 have gaps 20 while distal waveguides $18_2$, $18^{M-1}$ farther away from the symmetrical axis 15 of the distal slab waveguide 16 do not have any gaps. Although the figure illustrates only the outermost distal waveguides $18_1$, $18_M$ as not having any gaps the invention is not limited as such. It is contemplated that any number of waveguides adjacent to the outermost waveguides may also not have any gaps as well.

FIG. 1C illustrates another example of a device 1 of the present invention wherein distal waveguides $18_{1\ to\ M}$ may have single or multiple gaps $20_{1\ to\ M}$ per each waveguide $18_{1\ to\ M}$. FIG. 1C also demonstrates another feature of the present invention which provides that the number and width of the gaps for each waveguide $18_{1\ to\ M}$ may be selected independently for each waveguide $18_{1\ to\ M}$ and the configuration of such gaps may not necessarily be symmetrical about the symmetrical axis 15 of the distal slab waveguide 16. Moreover, when there are multiple gaps on a distal waveguide $18_{1\ to\ M}$, each gap may have a different configuration as described herein (e.g., a different angle, width, offset, etc.)

Figure 1G:
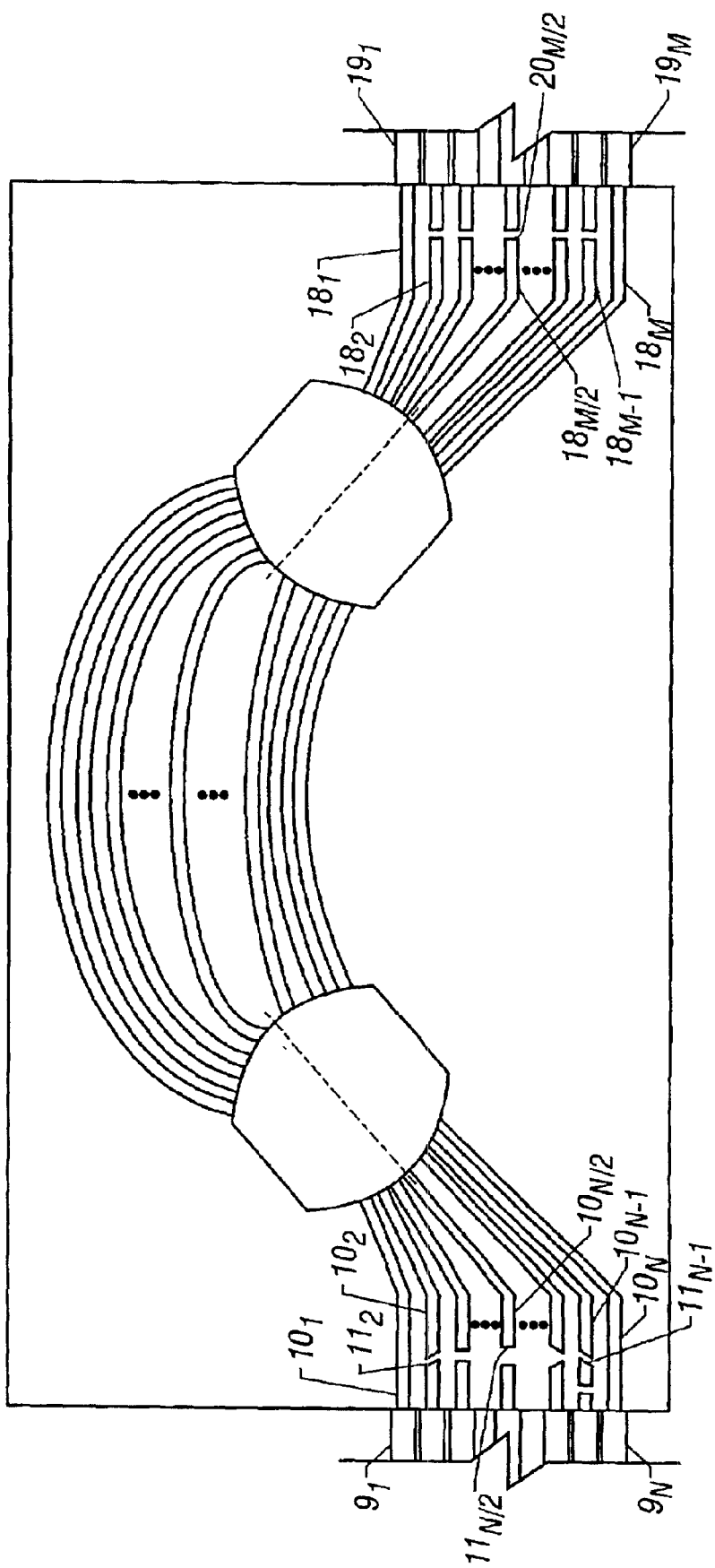
FIG. 1G is a plane view showing another variation of a device of the present invention.

It should be noted that the gaps may be incorporated into the proximal waveguides $10_{1\ to\ N}$ of the device. As shown in FIG. 1G, the proximal waveguides $10_{1\ to\ N}$ may have gaps $11_{1\ to\ N}$ as well. However, the configuration of the gaps $11_{1\ to\ N}$ may vary from the configuration of the gaps $20_{1\ to\ M}$ on the distal waveguides $18_{1\ to\ M}$. Moreover, a variation of the invention 1 includes gaps $11_{1\ to\ N}$ that are placed on the proximal waveguides $10_{1\ to\ N}$ with the distal waveguides $18_{1\ to\ M}$ not having any gaps.

FIGS. 2A–2G illustrate some variations of the gaps for use in the invention described herein.

Figure 2A:
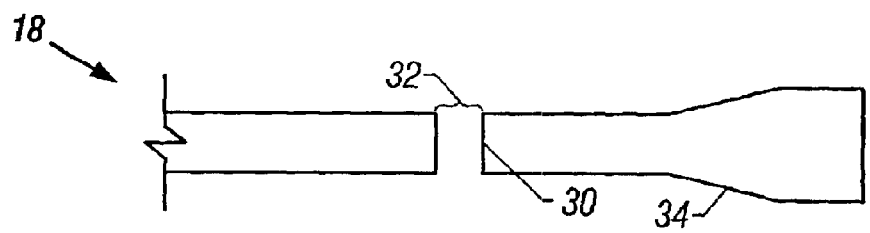
FIGS. 2A–2G illustrate variations of waveguides of the present invention.

FIG. 2A illustrates a distal waveguide 18 having a gap 30. The width 32 of the gap 30 may depend upon the position of the distal waveguide 18 relative to the center of the distal slab waveguide (not shown). It is contemplated that for any variation of the present invention the gap width may be small enough such that the ends of the waveguides on either side of a gap are in contact. The maximum gap width may be selected to result in the desired amount of insertion loss for the particular channel of the device. As illustrated, the waveguide 18 may have a taper 34 at the end of the waveguide 18. The distance between the gap 30 and the end of the waveguide 18 or taper 34 may vary as needed. As discussed above, the taper 34 may also aid in achieving uniformity of IL as the waveguide 18 couples to an optical fiber (not shown). This taper 34 may be present in any of the variations of the present invention.

Figure 2B:
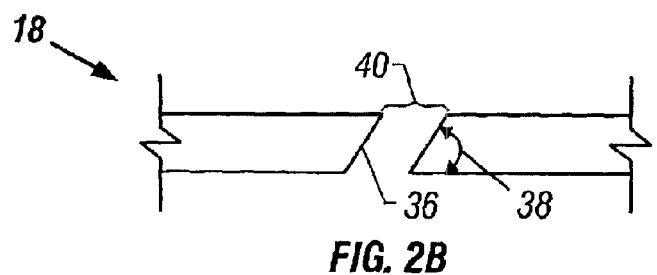

FIG. 2B illustrates another variation of a distal waveguide 18 having a gap 36 having a gap width 40. In this variation, the gap 18 forms an angle 38 with the distal waveguide 18. As with the gap width 40, the gap angle 38 may be selected to vary from each waveguide 18, or the gap angle 38 may not be the same for each wall of the waveguide 18 surrounding the gap 36. The gap angle 38 may be configured to be within a plane of the distal waveguide 18. In such a case, FIG. 2B would illustrate a top view of the distal waveguide 18. Moreover, the gap 36 may be formed such that it has an angle 38 with an axis that is orthogonal to a plane of the distal waveguide 18. In this latter case, FIG. 2B would illustrate a side view of the gap 36 and waveguide 18.

The gap angle 38 may be selected to minimize the amount of back-reflection of the optical signal which is generated by the gap 36. Excessive amounts of back-reflection may contribute to unwanted noise in the signal. Typically a gap angle 38 may range from 80° to close to 90°. Commonly, a gap angle 38 of 82° is used. It is noted that this same range of angles may be described as being from 0° through 10°, with 8° being commonly used. It will be apparent that the latter range of angles is equivalent to the former range, the difference being the reference axis from which the angle is measured. It is further noted that these angles are exemplary and the present invention is not limited merely to the previously stated range as the gap angle may be selected from any range of angles which allows for the desired amount of optical signal to pass through the gap. Furthermore, as stated above, it is not required that the end-faces of the waveguides on each side of the gap are parallel.

As noted above, the width 40 of the gap 36 may depend upon the position of the distal waveguide 18 relative to the center of the distal slab waveguide (not shown).

Figure 2C:
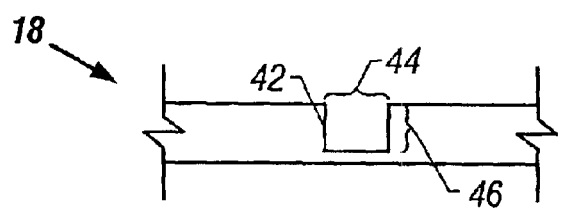

FIG. 2C illustrates another variation of the present invention. In this example, a distal waveguide 18 includes a gap 42 having a gap width 44. In this variation, the gap 42 extends for a predetermined depth 46 into the waveguide 18. Accordingly, the gap 42 may start from the top and extend towards the bottom of the waveguide 18. Another example includes the gap 42 extending from one side of the waveguide 18 towards another side. Moreover, although not illustrated, a gap may not be aligned with a top or side of the waveguide 18 resulting in the gap having a depth which varies along a cross-section of the waveguide.

Figure 2D:
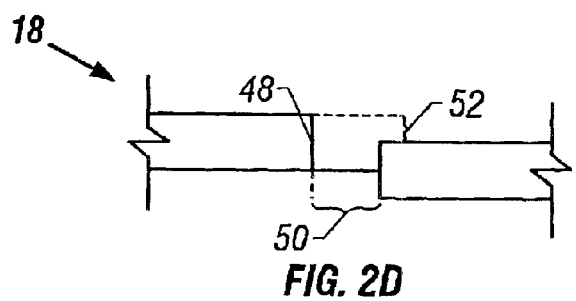

FIG. 2D illustrates a variation of the present invention wherein a waveguide 18 comprises a gap 48 having a predetermined gap width 50 where the waveguide 18 is misaligned across the gap 48. The offset 52 between the segments of the misaligned waveguide 18 may be selected to adjust the calibrated loss in the signal within the waveguide. As with the gap width 50 or angle (not shown in this illustration), the offset 52 may be varied for each waveguide 18 to aid in controlling the insertion loss of the separate channels.

Figure 2E:
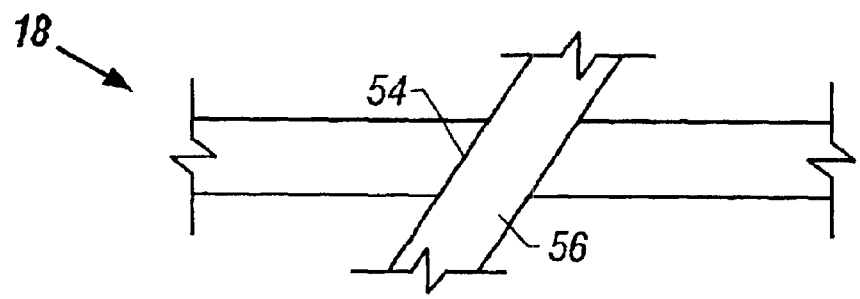

FIG. 2E illustrates a variation of the present invention wherein a waveguide 18 comprises a gap 54 having a gap material 56 placed therein. The gap material 56 may comprise a waveguide, top clad, a cap oxide, or any type of optic material.

Figure 2F:
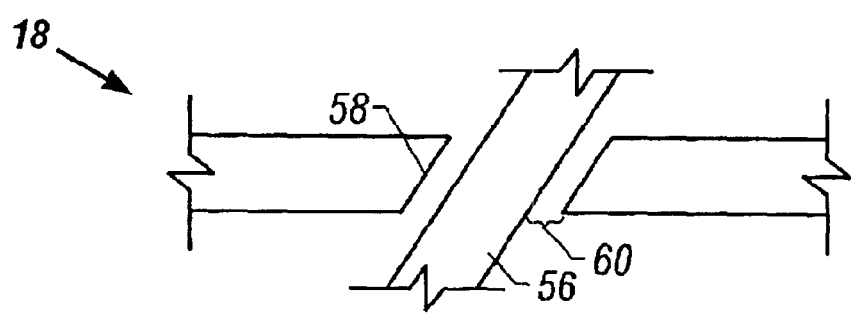

FIG. 2F illustrates another variation of the present invention wherein a waveguide 18 comprises a gap 58 having a gap material 56 placed therein. In this variation, there is a spacing 60 between the gap material 56 and the ends of the waveguide 18 immediately adjacent to the gap 58. This may be accomplished, for example, by selecting a gap 58 having a width that is larger than a width of the gap material 56. The spacing 60 may contain another material or may remain empty. Although the above examples illustrate the gap material 56 in gaps having gap angles, the gap material may be placed in a gap having which is substantially perpendicular to the waveguide.

Figure 2G:
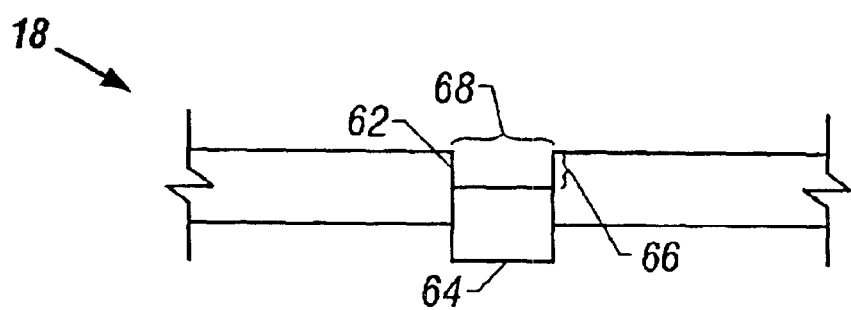

FIG. 2G illustrates a variation of the invention wherein a distal waveguide 18 has a gap 62 which includes a waveguide section 64 that is offset 66 by a predetermined amount. The offset 66 may be selected to produce a desired calibrated loss. Moreover, the section width 68 may be selected to achieve the desired result. It is noted that the waveguide section may comprise a material other than the waveguide (e.g., any other optic material, etc.)

It is understood that variations of the invention include combining the gap configurations described above. For example, it may be desirable to construct a device with some distal waveguides having gaps at an angle to the waveguide and other distal waveguides with gaps substantially perpendicular to the waveguide. Also, the orientation of the gaps may vary within the same device. It is also contemplated that a waveguide may have more than one gap located along its path. Moreover, the shapes of the ends of the waveguide on either side of the gap are not limited to what is illustrated. The ends of the waveguides on either side of the gap may have any shape as required.

Figure 3A:
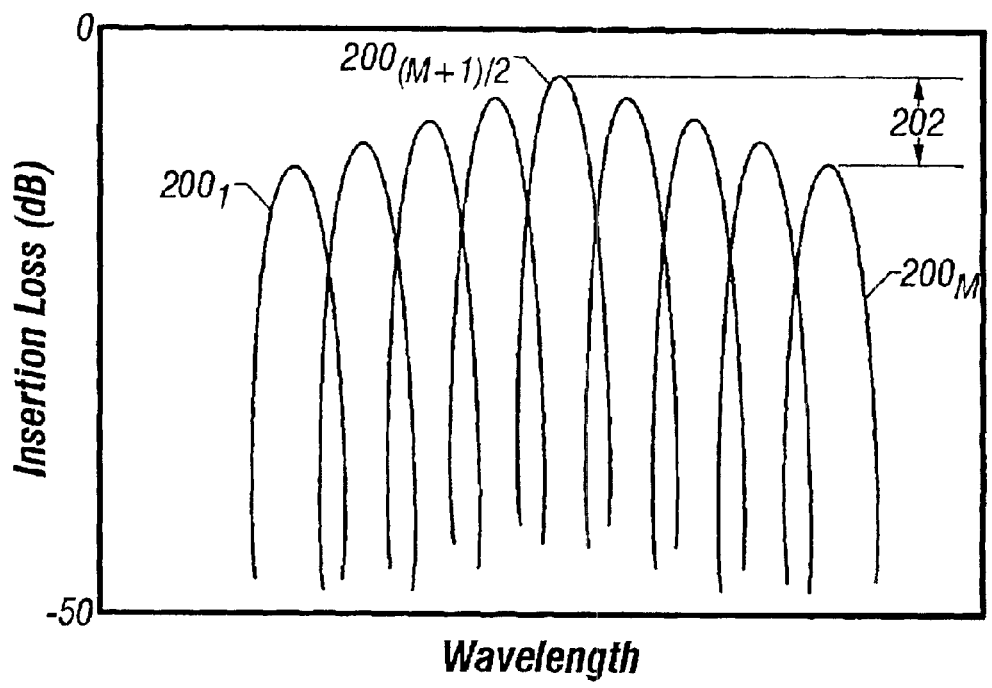
FIG. 3A is an example of a graph showing insertion loss of a conventional optical device used to multiplex or demultiplex optical signals.

FIG. 3A illustrates an example of a graph of IL for a device having several channels $200_{1 \ to \ M}$ of a specific wavelength where the device is not configured to provide uniformity of IL. The scale of the 'y' axis indicates the amount of IL (the higher the peak of the curve, the less the IL.) As shown in FIG. 3A, the center channel $200_{(M+1)/2}$ experiences less IL than the surrounding channels. Accordingly, the maximum IL 202 is the difference between the IL of the center channel $200_{(M+1)/2}$ and the IL of the end channels $200_1$, $200_M$.

Figure 3B:
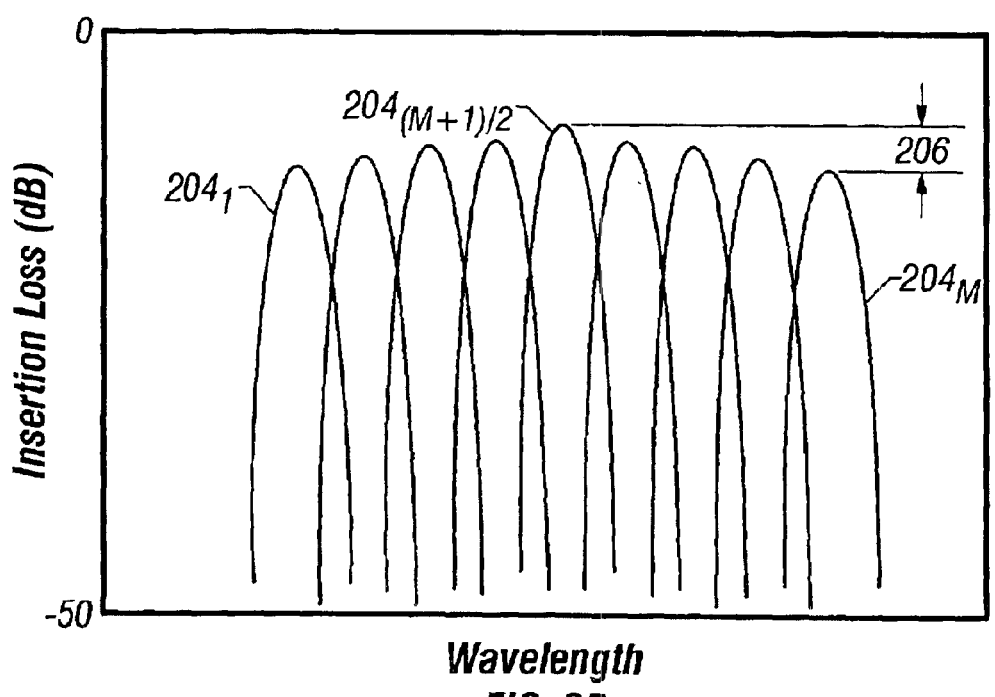
FIG. 3B is an example of a graph showing insertion loss of an optical device of the present invention used to multiplex or demultiplex optical signals.

In one of the variations of the present invention previously described, the gaps $20_{1 \ to \ M}$ for the distal waveguides $18_{1 \ to \ M}$ farthest from the center waveguide $18_{M/2}$ or $18_{(M+1)/2}$ are smaller than the gaps $20_{1 \ to \ M}$ for the distal waveguides $18_{1 \ to \ M}$ closer to the center waveguide $18_{M/2}$ or $18_{(M+1)/2}$. This configuration introduces more loss for channels closer to the central channel. FIG. 3B illustrates a graph of IL for such a device having several channels $204_{1 \ to \ M}$ of a specific wavelength where the device is configured to provide uniformity of IL. As shown in the graph, the IL of the center channels $204_2$ through $204_{M-1}$ are adjusted so that the maximum IL 206 is less than the maximum IL 202 of FIG. 3A. It is contemplated that the configuration of the gaps in each waveguide may be selected to achieve a condition other than uniformity of IL. In such a case, the device may be configured to have a customized signal profile. Achieving uniformity of IL is just one example of a customized signal profile.

Figure 4A:
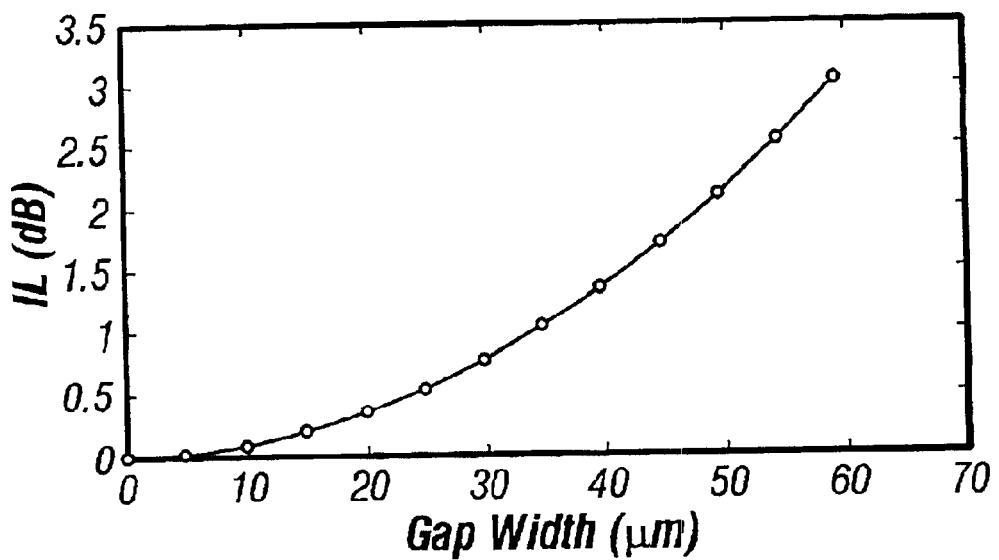
FIG. 4A shows an example of a graph of insertion loss as a function of gap width.

The configuration of a particular gap may be selected based upon experimentation of how gap characteristics (e.g., width, angle, offset, width, gap material, etc.) affect the signal profile of a device. For instance, in a device having particular waveguide characteristics (e.g., dimensions, index, material, etc.) experimentation may provide a correlation between the IL and a particular gap characteristic. FIG. 4A illustrates a simplified example which correlates the IL for a particular gap width. The graph of FIG. 4A may depend upon the features of the waveguides used during the respective experimentation which provided the illustrated results. Accordingly, FIG. 4A is shown as an example only as a graph of IL versus gap width may differ from the curve shown depending upon the characteristics of the particular waveguide.

Figure 4B:
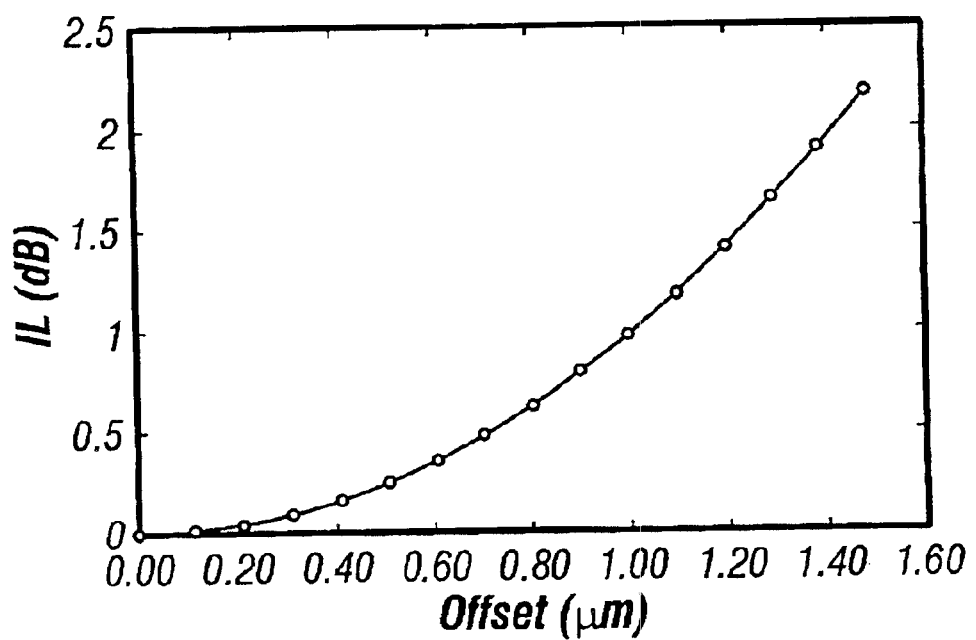
FIG. 4B shows an example of a graph of insertion loss as a function of gap offset.
Figure 4C:
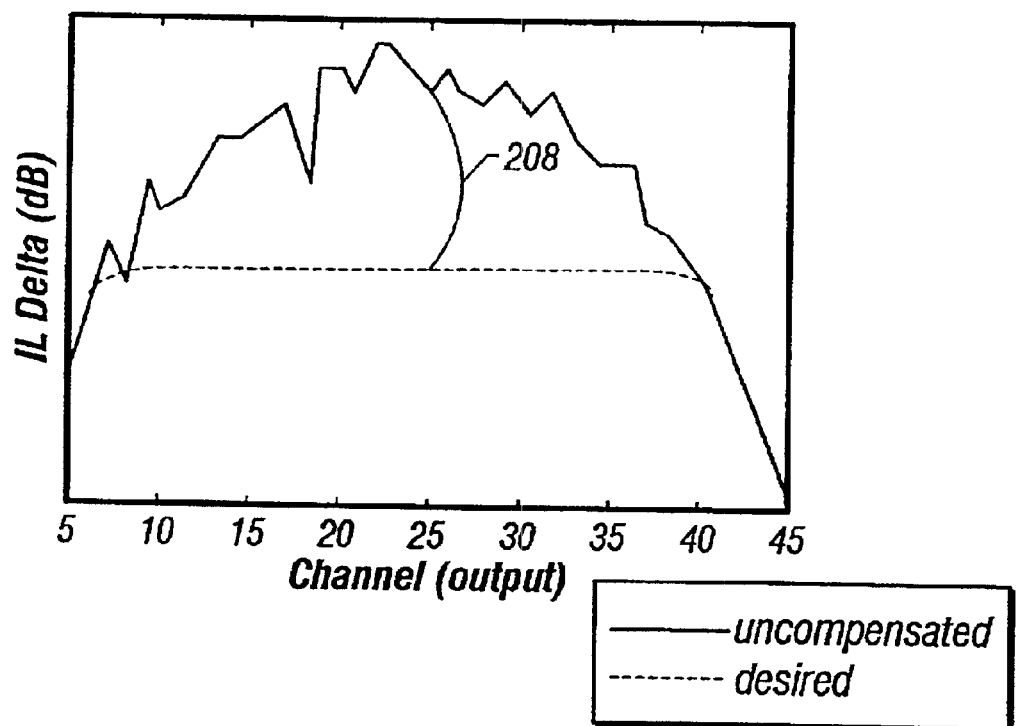
FIG. 4C shows a graph of the change in insertion loss for each channel with data for both an uncompensated device and the desired insertion loss for the device.

FIG. 4A demonstrates the IL as a function of the gap width. FIG. 4B demonstrates the IL as a function of the gap offset. These figures are intended to illustrate examples. Exact values may require experimentation on the particular device for incorporation of a gap. Given the above functions, the particular characteristics of a gap may be selected based upon the results desired. For example, FIG. 4C illustrates the change in EL versus each channel (e.g., an output channel) for a given device with both the uncompensated and desired curves for a particular device. Accordingly, the gap width for a particular channel can be selected to produce the desired result for the respective channel. As illustrated in FIG. 4C, the compensation amount 208 for channel 25 is shown to be the difference between mthe uncompensated output and the desired output. Thus, the compensation amount 208 may be referenced on the curve of FIG. 4A to select the characteristic of the gap for channel 25.

Figure 4D:
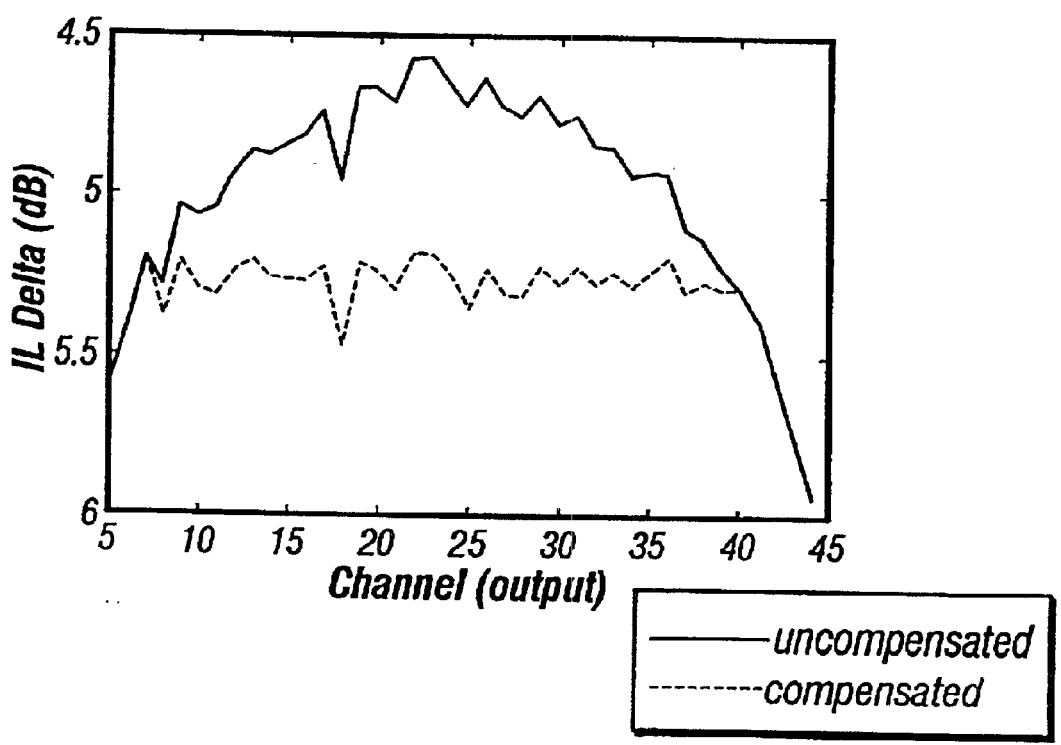
FIG. 4D shows a graph of the change of insertion loss for each channel of the device having the gap design of FIG. 4C prior to compensation and subsequent to compensation.

FIG. 4D illustrates the results of the device once gaps are incorporated into the device using the data obtained by the functions illustrated in FIGS. 4A and 4B. As shown in FIG. 4D, the compensated signal is closer to the previously desired result.

The above illustrations are examples of the invention described herein. It is contemplated that combinations of aspects of specific embodiments or combinations of the specific embodiments themselves are within the scope of this disclosure.

Further details as to the use or other variation of the apparatus described herein may be drawn from the background which is intended to form part of the present invention. It is noted that this invention has been described and specific examples of the invention have been portrayed to convey a proper understanding of the invention. The use of such examples is not intended to limit the invention in any way. Additionally, to the extent that there are variations of the invention which are within the spirit of the disclosure and are equivalent to features found in the claims, it is the intent that the claims cover those variations as well. All equivalents are considered to be within the scope of the claimed invention, even those which may not have been set forth herein merely for the sake of brevity.

What is claimed is:

1. An optical device for controlling insertion loss of wavelength-division multiplexed signals comprising a plurality of signals, each signal having a predetermined wavelength different from the remaining signals, the optical device comprising:
   a phased array having a proximal end and a distal end, said phased array comprising a plurality of waveguides extending between said proximal and distal ends, each said waveguide having a predetermined length different from another waveguide;
   at least one proximal waveguide having a first end and a second end;
   a proximal slab waveguide between said proximal end of said phased array and said second end of said proximal waveguide;
   a plurality of distal waveguides each having a first end and a second end, at least one of said plurality of distal waveguides includes at least one gap between said first and second ends; and
   a distal slab waveguide between said distal end of said phased array and said second end of said distal waveguide, wherein
      said gap of each of said distal waveguides varies between said plurality of distal waveguides.

2. The optical device according to claim 1, wherein said plurality of distal waveguides are arranged in an order and a width of said gap is largest towards a center axis of said distal slab waveguide.

3. The optical device according to claim 1, wherein said gap of each distal waveguide is selected to contribute to an insertion loss for each distal waveguide such that a difference in total insertion loss between each of said plurality of distal waveguides is minimized.

4. The optical device according to claim 1, wherein at least one of said gaps forms an angle with said distal waveguide in a plane of the distal waveguide.

5. The optical device according to claim 4, wherein said angle equals is measured between a face of said distal waveguide adjacent to said gap and a side of said distal waveguide, and said angle is between 70 and 80 degrees.

6. The optical device according to claim 5, wherein said angle is 82 degrees.

7. The optical device according to claim 4, wherein said angle equals is measured between a face of said distal waveguide adjacent to said gap and said axis, and said angle is between 70 and 90 degrees.

8. The optical device according to claim 7, wherein said angle is 82 degrees.

9. The optical device according to claim 1, wherein at least one of said gaps forms an angle with an axis orthogonal to a plane of said distal waveguide.

10. The optical device according to claim 1, wherein at least one of said distal waveguides includes may than one of said gaps.

11. The optical device according to claim 1, wherein at least one of said gaps extends only partially through one of said distal waveguides.

12. The optical device according to claim 1, wherein at least one of said distal waveguides having said gap includes a first portion and a second portion on either side of said gap, and wherein said first and said second portions are misaligned by an offset distance.

13. The optical device according to claim 1, wherein at least one of said distal waveguides having said gap includes a gap material placed within said gap.

14. The optical device according to claim 13, wherein a width of said gap having said gap material than a width of said gap material.

15. The optical device according to claim 14, wherein said gap material comprise an offset section distal waveguide.

16. The optical device according to claim 1, wherein said optical device is a planar lightwave circuit.

17. The optical device according to claim 1, further comprising at least one gap between in at least one of said plurality of proximal waveguides, wherein said gap is located between said first and second ends of said distal waveguide.

18. An optical device for controlling insertion loss of wavelength-division multiplexed signals comprising a plurality of signals, each signal having a predetermined wavelength different from the remaining signals, the optical device comprising:
   a phased array having a proximal end and a distal end, said phased array comprising a plurality of waveguides extending between said proximal and distal ends, each said waveguide having a predetermined length different from another waveguide;
   a plurality of proximal waveguides each having a first end and a second end, at least one of said proximal waveguides includes at least one gap between said first and second ends;
   a proximal slab waveguide between said proximal end of said phased array and said second end of said proximal waveguide;
   a plurality of distal waveguides each having a first end and a second end; and
   a distal slab waveguide between said distal end of said phased array and said second end of said distal waveguide, wherein
   said gap of each of said proximal waveguides varies between said plurality of proximal waveguides.

19. An optical device for controlling insertion loss of wavelength-division multiplexed signals comprising a plurality of signals, each signal having a predetermined wavelength different from the remaining signals, the optical device comprising:
   a phased array having a proximal end and a distal end, said phased array comprising a plurality of waveguides extending between said proximal and distal ends, each said waveguide having a predetermined length different from another waveguide;
   at least one proximal waveguide having a first end and a second end;
   a proximal slab waveguide between said proximal end of said phased array and said second end of said proximal waveguide;
   a plurality of distal waveguides each having a first end and a second end,
   at least one means for controlling insertion loss of the signal transmitted through either said distal and or proximal waveguides, said means for controlling insertion loss located between said first and second ends of either said distal and/or proximal waveguides; and
   a distal slab waveguide between said distal end of said phased array and said second end of said distal waveguide, wherein
   said means for controlling insertion loss varies between said distal and/or proximal waveguides.

* * * * *